Patented Nov. 21, 1950

2,530,390

UNITED STATES PATENT OFFICE 2,530,390

ADDUCTS OF 22-ARYL-BISNOR-5,7,9(11)-CHOLATRIEN-22-ONES

Robert H. Levin and A. Vern McIntosh, Jr., Kalamazoo, Mich., assignors to The Upjohn Company, Kalamazoo, Mich., a corporation of Michigan No Drawing. Application August 23, 1949, Serial No. 111,973

6 Claims. (Cl. 260—239.55)

This invention relates to certain adducts of 22-arylbisnor-5,7,9(11)-cholatrien-22-ones with maleic acid, maleic acid anhydride, and maleic acid diesters, and to a method for the preparation thereof.

The compounds of the present invention can be represented by the following graphic formula:

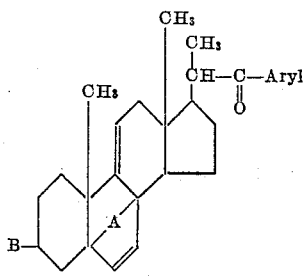

wherein B is a hydroxyl group or an esterified hydroxyl group and A is an adduct bridge between the two carbon atoms designated as carbon atoms 5 and 8, such adduct radicals being derived from a dienophile selected from the group consisting of maleic acid, maleic acid anhydride, and diesters of maleic acid. The aryl group in the above formula may be any convenient aryl group which will form a diaryl cadmium compound, a preferred embodiment of the invention residing in compounds wherein the aryl group is solely of hydrocarbon nature and contains up to twelve carbon atoms, inclusive.

It is an object of this invention to provide a novel group of compounds, adducts of 22-aryl-bisnor-5,7,9(11)-cholatrien-22-ones, which are highly useful in the production of steroids having an oxygen atom attached to carbon atom 11. It is an additional object to provide a process for the production of such novel aryl ketones. Other objects will become apparent hereinafter.

The compounds prepared by the method of the present invention, as previously stated, are useful in the preparation of steroid compounds having an oxygen atom attached to carbon atom eleven. Such compounds are of particular interest in the field of steroid research due to the biological activity of the cortical hormones and certain known derivatives thereof, which oxygenated steroids are known to have biological effects differing markedly from the unoxygenated steroids. It is, therefore, of importance to investigate the oxygenated derivatives of such adducts, particularly those oxygenated at carbon atom eleven, as well as to investigate the biological activity of the adducts themselves and their transformation products. The importance of such investigation is moreover emphasized by the acute shortage of adrenal cortical hormones, and the absence of any present suggestion for alleviation of the said shortage except through organic synthesis.

Novel compounds of the present invention which are of particular interest are compounds of the above generic formula wherein B represents a hydroxyl radical or an acyloxy radical containing up to and including eight carbon atoms, i. e., an ester of the 3-hydroxyl group with a carboxylic acid such as formic, acetic, propionic, butyric, valeric, hexanoic, heptanoic, octanoic, cyclopentanoic, cyclohexanoic, benzoic, toluic, and the like, including acids having substituents, such as halo, hydroxy, and methoxy, which are non-reactive under the conditions of reaction necessary for formation of the compound. The adduct bridge (–A–) in such compounds can be represented by the formula:

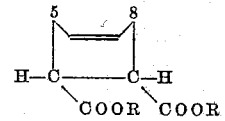

wherein R represents hydrogen or a lower-alkyl radical, e. g., methyl, ethyl, propyl, butyl, pentyl, hexyl, heptyl, octyl, isopropyl, isobutyl, cyclohexyl, benzyl, and the like, which radicals may be the same or different. The preferred embodiment of R is a hydrocarbon radical, preferably a lower-alkyl radical, containing from one to eight carbon atoms, inclusive, although esterifying radicals carrying non-reactive substituents, such as halo, hydroxy, or methoxy, are also suitable. Alternatively, the formula for the adduct may be depicted by:

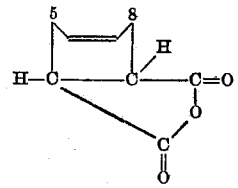

which is representative of the maleic anhydride adduct.

The compounds of this invention are usually colorless crystalline solids, insoluble in water, soluble in ether and halogenated hydrocarbons, and moderately soluble in methanol, ethyl acetate, and benzene. The acid anhydride adducts are readily converted to the free acid adducts by hydrolysis. These acid adducts in turn are readily converted into ester adducts by esterification with conventional reagents such as the diazoalkanes [Wilds et al., J. Org. Chem. 13 763 (1948)]. Conversely, the maleic acid ester adducts may be hydrolyzed to the dibasic acids, which in turn may be converted to the corresponding maleic anhydride adduct by heating with a carboxylic acid anhydride, such as acetic anhydride or the like, or by heat alone.

The compounds of the present invention are conveniently prepared by mixing a maleic acid ester or anhydride adduct of a 3-hydroxy- or 3- acyloxy - bisnor - 5,7,9(11) - cholatrienoyl halide with a diaryl cadmium compound, in the presence of an inert organic solvent for the reaction, e. g., ethers or aromatic hydrocarbons, at a temperature between about zero and 100 degrees centigrade. For purposes of the process of the present invention, a diaryl cadmium compound containing any aryl or substituted aryl group, the substituents of which are non-reactive under the conditions of reaction, may be employed. Representative aryl groups include the phenyl, benzyl, phenethyl, alpha-naphthyl, ortho-tolyl, para-biphenyl, anisyl, methoxynaphthyl, chlorophenyl, and the like. A preferred manner of conducting the process is to admix the reactants at about minus twenty to plus ten degrees centigrade for about five to ten minutes, and then to heat the reaction mixture at between about 35 and 100 degrees centigrade for the remainder of the reaction period, usually about one to three hours. Upon completion of the reaction, the reaction product is cooled, poured into a mixture of ice and dilute acid, and the desired 22-arylbisnor-5,7,9(11)-cholatrien-22-one adduct isolated by crystallization or other conventional procedure.

The esters of dehydroergosterol, from which the starting adducts are obtained, can be prepared by methods heretofore described [Honigmann, Ann. 508, 89 (1934)] from 3-esters of ergosterol, for example, by adding maleic anhydride to dehydroergosterol acetate, which is prepared from ergosteryl acetate using mercuric chloride [Windaus et al., Ann. 465, 157 (1928)]. 3-Acyloxybisnor-5,7,9(11)-cholatrienoic acid adducts can be conveniently prepared by ozonization of an adduct of a 3-acyloxy dehydroergosterol, as described and claimed in the copending application of Robert H. Levin, Serial No. 63,613, filed 1948 December 4. According to the method of this application, the 3-acyloxy-bisnor-5,7,9(11)-cholatrienic acid adducts are prepared by ozonizing an organic solvent solution of a dehydroergosterol 3-ester with from 1.25 to 2.5 moles of ozone per mole of starting dehydroergosterol 3-ester, and decomposing and oxidizing the ozonide with hydrogen peroxide. Alternatively, the decomposition is accomplished using zinc dust in glacial acetic acid, and the oxidation to the desired bisnor cholatrienoic acid adduct conducted with silver nitrate or chromic acid in glacial acetic acid. The acid chloride adducts can then be prepared therefrom by allowing a 3-acyloxybisnor-5,7,9-cholatrienoic acid adduct to react with thionyl chloride or bromide in the presence of a small amount of pyridine.

Although the process herein is particularly described using a starting compound wherein a 3-hydroxyl group is esterified, it is to be understood that this is merely a preferred embodiment of the invention due to the relative inconvenience of preparing an acid chloride or bromide when a free hydroxyl group is present in the molecule. This can be readily accomplished, however, by using oxalyl chloride instead of thionyl chloride, and the process is not to be construed as limited to starting adducts which are acylated at the 3-hydroxyl group. Since the acyl group is readily removed by hydrolysis, and since the hydroxyl group is not affected during the method of the present invention, it is a matter of choice as to whether a 3-acyloxy or 3-hydroxy adduct be employed.

The following preparations and examples are given by way of illustration and are not to be construed as limiting.

*Preparation 1.—Maleic anhydride adduct of 3 - beta - acetoxy - bisnor - 5,7,9(11) - cholatrienic acid*

A solution of thirty grams (0.056 mole) of the 5, 8-maleic anhydride adduct of dehydroergosteryl acetate in 600 milliliters of methylene chloride was cooled to minus 78 degrees centigrade and maintained at that temperature while 3.544 grams of ozone (1.3 moles per mole of adduct) was passed into the solution over a period of three hours. The reaction mixture was diluted with 500 milliliters of glacial acetic acid and the methylene chloride fractionally distilled in vacuo. An additional 200 milliliters of acetic acid was added, the solution cooled to fifteen degrees centigrade, and the ozonide decomposed by adding 44 grams of zinc dust, in portions, with mechanical stirring. The temperature was maintained between fifteen and twenty degrees centigrade for the thirty minutes required for the addition. One milliliter of one per cent silver nitrate solution was then added, and stirring continued for twenty minutes, at the end of which time a test for peroxide with starch-iodide paper was negative. The zinc was then separated by filtration and washed with acetic acid.

The combined acetic acid solution was then cooled to eighteen degrees centigrade and stirred mechanically while being treated with a solution of chromic acid (11.2 grams in ten milliliters of water and thirty milliliters of acetic acid) for a period of three and one-half hours. The excess chromic acid was destroyed by the addition of fifteen milliliters of methanol and two grams of sodium bisulfite, and the reaction mixture poured into two liters of water. The product precipitated and was separated by filtration and washed with water. The yield was 22.1 grams (82 per cent) of the crude 5, 8-maleic anhydride adduct of 3-beta-acetoxybisnor-5,7,9(11)-cholatrienic acid, melting point 226–237 degrees centigrade. Recrystallization from methanol and from ether-hexane gave 11.1 grams (55 per cent) of pure acid, melting point 239.5 to 243 degrees centigrade.

Analysis:
Calculated for $C_{28}H_{34}O_7$: C 69.69 H 7.10
Found: C 69.73 H 7.17

Starting with a 5,8-adduct of the corresponding dehydroergosteryl 3-ester, in the same manner are produced the 5,8-maleic acid, anhydride, and diester adducts of 3-formoxy, 3-propionoxy, 3-butyroxy, 3-heptoyloxy, 3-octanoyloxy, and 3-benzoyloxybisnor - 5,7,9(11) - cholatrienic acids, which in turn are converted to the corresponding acid chloride or bromide by reaction with thionyl chloride, thionyl bromide, or oxalyl chloride, as described in Preparation 2. Alternatively, the 3-esters are first hydrolyzed to the free hydroxyl compound, which may then be converted to the acid chloride with oxalyl chloride.

*Preparation 2.—Maleic anhydride adduct of 3-beta - acetoxybisnor - 5,7,9(11) - cholatrienoyl chloride*

A suspension of 2.27 grams of the maleic anhydride adduct of 3-beta-acetoxybisnor-5,7,9(11)-cholatrienoic acid in eighty milliliters of benzene, forty milliliters of dry diethyl ether, three milliliters of thionyl chloride, and 0.2 milliliter of ten per cent pyridine in benzene was stirred at room temperature for three hours, filtered to remove a small amount of insoluble material, and the volatile components removed under reduced pressure.

The resulting white foamy solid was triturated with ether and filtered. There was thus obtained the maleic anhydride adduct of 3-beta-acetoxy-bisnor-5,7,9(11)-cholatrienoyl chloride, melting at 183 to 186 degrees centigrade.

Analysis:
Calculated for $C_{28}H_{33}O_6Cl$: Cl, 7.1
Found: Cl, 6.4.

*Example.—Maleic anhydride adduct of 3-beta-acetoxy-22-phenylbisnor-5,7,9(11)-cholatrien-22-one*

A solution of three grams of the maleic anhydride adduct of 3 beta-acetoxybisnor-5,7,9(11)-cholatrienoyl chloride was added at a uniform rate over a period of seven minutes to a solution of diphenyl cadmium (prepared from 7.7 milliliters of bromobenzene, 1.5 grams of magnesium turnings, 7.8 grams of anhydrous cadmium chloride and 70 milliliters of diethyl ether), while maintaining the temperature at zero to minus ten degrees centigrade. The mixture was then heated under reflux for one and one-half hours, cooled, and poured onto a mixture of ice and twenty milliliters of concentrated hydrochloric acid. The organic layer was separated, washed with an equal volume of water, concentrated to a volume of about twenty milliliters, and allowed to stand for six hours. Upon filtration, there was obtained 1.29 grams of the maleic anhydride adduct of 3-beta-acetoxy-22-phenylbisnor-5,7,9(11)-cholatrien-22-one, which melted at 270 to 272 degrees Centigrade. Recrystallization of the crude product from a mixture of chloroform and ethanol raised the melting point to 279 to 283 degrees centigrade. The compound exhibited the expected absorption spectrum of a conjugated phenyl ketone, having a λ maximum of 2440 Angstroms and an E maximum of 14 600.

In the same manner, starting from the appropriate acid chloride, are produced the maleic anhydride or maleic acid diester adducts of 3-propionoxy-22-naphthylbisnor-5,7,9(11)-cholatrien-22-one, 3-butyroxy-22-tolylbisnor-5,7,9(11)-cholatrien-22-one, 3-heptoyloxy-22-para-biphenyl-bisnor-5,7,9(11)-cholatrien-22-one, 3-benzoyloxy-22-phenylbisnor-5,7,9(11)-cholatrien-22-one, 3-hydroxy-22-benzyl-5,7,9(11)-cholatrien-22-one and the like, which may be subjected to additional permutations at the 3-carbon atom and/or in the adduct group, as previously described.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 22-arylbisnor-5,7,9(11)-cholatrien-22-one adduct represented by the formula:

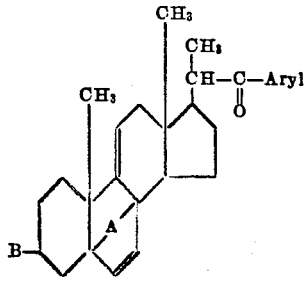

wherein B is a member of the group consisting of hydroxyl and an acyloxy group derived from an unsubstituted monocarboxylic aliphatic acid containing from one to eight carbon atoms, inclusive; A is an adduct radical derived from a dienophile from the group consisting of maleic acid, maleic anhydride, and di-lower-alkyl esters of maleic acid, wherein the esterifying groups are solely of hydrocarbon nature and contain from one to eight carbon atoms, inclusive; and wherein aryl is an unsubstituted aryl radical of solely hydrocarbon nature containing up to and including twelve carbon atoms.

2. Maleic anhydride adduct of a 3-acetoxy-22-arylbisnor-5,7,9(11)-cholatrien-22-one, wherein the aryl group is solely of hydrocarbon nature and contains up to twelve carbon atoms, inclusive.

3. Maleic anhydride adduct of 3-acetoxy-22-phenylbisnor-5,7,9(11)-cholatrien-22-one.

4. The process for the preparation of a 22-arylbisnor-5,7,9(11)-cholatriene adduct which includes the step of mixing (1) a compound of the formula:

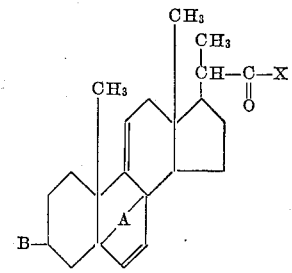

wherein B is a member of the group consisting of hydroxyl and an acyloxy group derived from an organic acid containing up to and including eight carbon atoms; A is an adduct radical derived from a dienophile from the group consisting of maleic acid anhydride and diesters of maleic acid wherein the esterifying groups contain up to and including eight carbon atoms; and wherein X is a halogen atom selected from the group consisting of bromine and chlorine, with (2) a diaryl cadmium compound, wherein the aryl radicals contain up to and including twelve carbon atoms and are non-reactive under the conditions of reaction, at a temperature between about minus twenty degrees and plus one hundred degrees centigrade and in the presence of an inert organic solvent, and separating from the reaction product a 22-arylbisnor-5,7,9(11)-cholatriene adduct having the formula given above for the starting adduct (1) wherein the halogen atom (X) has been replaced by an aryl group from the diaryl cadmium compound (2).

5. The process of claim 4, wherein the diaryl cadmium compound is diphenyl cadmium.

6. The process of claim 4, wherein the starting adduct (1) is 3-acetoxybisnor-5,7,9(11)-cholatrienoyl chloride maleic anhydride adduct.

ROBERT H. LEVIN.
A. VERN McINTOSH, JR.

No references cited.